US012802160B2

(12) United States Patent
Lee

(10) Patent No.: US 12,802,160 B2
(45) Date of Patent: Nov. 17, 2026

(54) OPTICAL INSPECTION DEVICE AND OPTICAL INSPECTION METHOD USING THE SAME

(71) Applicant: Samsung Display Co., LTD., Yongin-si (KR)

(72) Inventor: Hyung Jin Lee, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 263 days.

(21) Appl. No.: 18/512,425

(22) Filed: Nov. 17, 2023

(65) Prior Publication Data

US 2024/0281923 A1 Aug. 22, 2024

(30) Foreign Application Priority Data

Feb. 22, 2023 (KR) ........................ 10-2023-0023874

(51) Int. Cl.
*G06T 3/4038* (2024.01)

(52) U.S. Cl.
CPC .................................. *G06T 3/4038* (2013.01)

(58) Field of Classification Search
CPC ....... G06T 3/4038; G06T 3/4069; G06T 5/90; G06T 7/0004; G01N 21/94; G01N 21/8851; G01N 2021/1782; G01N 2021/8887; G06V 10/764
See application file for complete search history.

(56) References Cited

U.S. PATENT DOCUMENTS 5,243,443 A * 9/1993 Eschbach ............. H04N 1/4053 358/465
7,725,258 B2 * 5/2010 Smitherman .......... G01C 11/02 348/144
7,936,374 B2 * 5/2011 Cutler ....................... G06T 5/40 348/211.3
8,031,940 B2 * 10/2011 Vincent .................. G06V 20/63 382/176
10,748,256 B2 * 8/2020 Hayashi .................... G06T 5/20
D1,050,358 S * 11/2024 Sofy ............................ D23/233
2005/0259059 A1 * 11/2005 Park ..................... G09G 3/3648 345/89
2005/0265631 A1 * 12/2005 Mai ....................... G06T 3/4038 382/284

(Continued)

FOREIGN PATENT DOCUMENTS

KR 1020000025566 5/2000
KR 1020060057907 5/2006

(Continued)

*Primary Examiner* — Solomon G Bezuayehu
(74) *Attorney, Agent, or Firm* — CANTOR COLBURN LLP

(57) ABSTRACT

An optical inspection device includes: an optical inspection main body on which a target substrate is mounted; high-resolution cameras spaced from the target substrate and disposed in the optical inspection main body, where the high-resolution cameras photograph high-resolution images; and an image converter which converts the high-resolution images into a low-resolution image, where the image converter includes a gray uniformizer which adjusts grays of the high-resolution images to allow a gray deviation among the high-resolution images to be equal to or less than a deviation reference value.

6 Claims, 8 Drawing Sheets

(56) References Cited

U.S. PATENT DOCUMENTS

| | | | | |
|---|---|---|---|---|
| 2009/0041348 | A1* | 2/2009 | Someya | H04N 5/20 345/589 |
| 2009/0287440 | A1* | 11/2009 | Kulkarni | G05B 19/41875 702/82 |
| 2010/0194851 | A1* | 8/2010 | Pasupaleti | G06T 3/4038 348/E7.001 |
| 2010/0309308 | A1* | 12/2010 | Saphier | G01N 21/8851 382/145 |
| 2013/0136327 | A1* | 5/2013 | Kamei | A61B 5/489 382/128 |
| 2014/0125810 | A1* | 5/2014 | D'Amico | H04N 23/45 348/280 |
| 2014/0268105 | A1* | 9/2014 | Bills | G02B 21/0052 356/450 |
| 2016/0088287 | A1* | 3/2016 | Sadi | G02B 27/017 348/43 |
| 2016/0239967 | A1* | 8/2016 | Chou | G06T 7/11 |
| 2018/0082454 | A1* | 3/2018 | Sahu | G06T 3/4038 |
| 2020/0357096 | A1* | 11/2020 | Gao | G01N 21/6458 |
| 2020/0382721 | A1* | 12/2020 | Harfouche | G01N 21/8806 |

FOREIGN PATENT DOCUMENTS

| | | |
|---|---|---|
| KR | 1020210016247 | 2/2021 |
| KR | 1020210055853 | 5/2021 |
| KR | 102425404 | 7/2022 |

* cited by examiner

OPTICAL INSPECTION DEVICE AND OPTICAL INSPECTION METHOD USING THE SAME

This application claims priority to Korean Patent Application No. 10-2023-0023874, filed on Feb. 22, 2023, and all the benefits accruing therefrom under 35 U.S.C. § 119, the content of which in its entirety is herein incorporated by reference.

BACKGROUND

1. Field

The present disclosure relates to an optical inspection device and an optical inspection method using the optical inspection device.

2. Description of the Related Art

In general, an optical inspection device inspects foreign substances or stains based on an optical system. The optical inspection device may inspect foreign materials by obtaining images during various manufacturing processes including a substrate process, a deposition process, and a module process.

A high-resolution optical inspection device performs a micro inspection for scanning high-resolution cameras for multiple times and inspecting images, and a low-resolution optical inspection device performs a macro inspection for taking a photograph once with a low-resolution camera and inspecting the image.

For example, the optical inspection device used in the substrate process must be a high-resolution optical inspection device for detecting the foreign substances with the size of 0.6 micrometer (μm) to 3 μm per pixel to detect fine foreign substances of equal to or less than 1 μm, and the optical inspection device used in the deposition process must be a low-resolution optical inspection device for detecting the foreign substances with the size of 10 μm to 30 μm per pixel to detect stains of organic films.

SUMMARY

When foreign substances are inspected by using a high-resolution optical inspection device, an image in a target inspect region is compared to an image of an adjacent inspect region to inspect whether there are foreign substances, and it may be difficult to accurately inspect the foreign substances when the foreign substances are bigger than the target inspect region. That is, it may be difficult to perform a macro inspection by using a high-resolution optical inspection device.

As described, as it is difficult to inspect all the foreign substances by using one optical inspection device in the various manufacturing processes with different sizes of target foreign substances, a high-resolution optical inspection device and a low-resolution optical inspection device may be respectively used depending on the size of the target foreign substances. Therefore, manufacturing process costs may increase.

The present disclosure attempts to provide an optical inspection device for allowing high-resolution and low-resolution inspections using a high-resolution camera, and an optical inspection method using the optical inspection device.

An embodiment of the present disclosure provides an optical inspection device including: an optical inspection main body on which a target substrate is mounted; a plurality of high-resolution cameras spaced from the target substrate and disposed in the optical inspection main body, where the high-resolution cameras photograph high-resolution images; and an image converter which converts the high-resolution images into a low-resolution image, where the image converter includes a gray uniformizer which adjusts grays of the high-resolution images to allow a gray deviation among the high-resolution images to be equal to or less than a deviation reference value.

In an embodiment, the gray uniformizer may compare adjacent high-resolution images to detect high-resolution images with the maximum gray deviation, and may uniformize grays among the detected high-resolution images to generate a plurality of compensated images when the gray deviation is greater than a deviation reference value.

In an embodiment, the image converter may further include an image combining portion which generates the low-resolution image by combining the compensated images having a uniform gray, the gray deviation among which is equal to or less than the deviation reference value.

In an embodiment, the deviation reference value may be 0.5.

In an embodiment, a resolution of the high-resolution image may be higher than a resolution of the low-resolution image.

In an embodiment, the high-resolution camera may have a resolution of 0.6 micrometer (μm) to 3 μm per pixel.

In an embodiment, the high-resolution cameras may include twelve high-resolution cameras disposed in a 4×3 matrix form.

An embodiment of the present disclosure provides an optical inspection method including: generating a plurality of high-resolution images by photographing a target substrate by using a plurality of high-resolution cameras; and converting the high-resolution images into a low-resolution image by using an image converter, where the converting the high-resolution images into the low-resolution image includes adjusting grays of the high-resolution images by using a gray uniformizer to allow a gray deviation among the high-resolution images to be equal to or less than a deviation reference value.

In an embodiment, the adjusting grays of the high-resolution images by using the gray uniformizer may include performing a compensation operation by comparing adjacent high-resolution images to detect high-resolution images with the maximum gray deviation, and uniformizing the grays among the detected high-resolution images when the gray deviation is greater than a deviation reference value, and repeating the compensation operation to generate a plurality of compensated images to allow the gray deviation to be equal to or less than the deviation reference value.

In an embodiment, the converting the high-resolution images into the low-resolution image may further include combining the compensated images having a uniform gray, the gray deviation among which is equal to or less than the deviation reference value to generate the low-resolution image.

In an embodiment, the combining the compensated images having the uniform gray may include arranging patterns which are similar to each other between the compensated images and combining the patterns to each other.

In an embodiment, the deviation reference value may be 0.5.

According to embodiments of the invention, the high-resolution and low-resolution inspections may be performed by using a high-resolution camera without using an additional low-resolution camera, such that the manufacturing process cost may be reduced.

DETAILED DESCRIPTION

Figure 1:
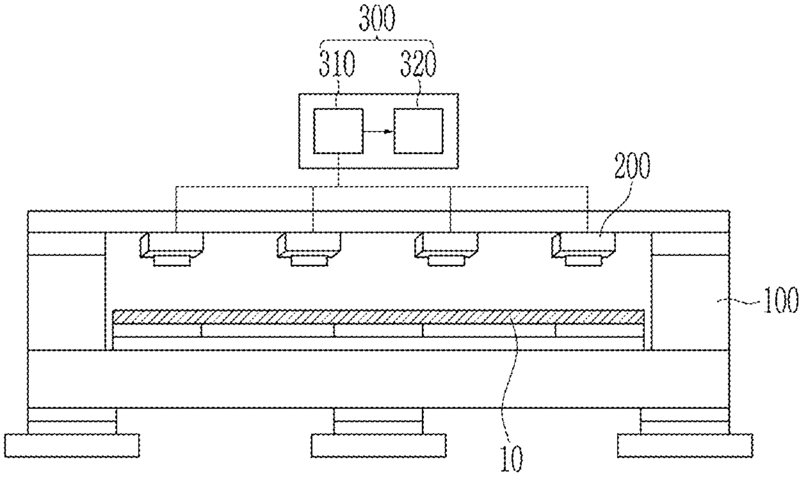
FIG. 1 shows an optical inspection device according to an embodiment.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the ar.

Parts that are irrelevant to the description will be omitted to clearly describe the present disclosure, and the same elements will be designated by the same reference numerals throughout the specification.

The size and thickness of each configuration shown in the drawings are arbitrarily shown for better understanding and ease of description, but the present disclosure is not limited thereto. The thicknesses of layers, films, panels, regions, etc., are enlarged for clarity. The thicknesses of some layers and areas are exaggerated for convenience of explanation.

It will be understood that when an element such as a layer, film, region, or substrate is referred to as being "on" another element, it can be directly on the other element or intervening elements may also be present. In contrast, when an element is referred to as being "directly on" another element, there are no intervening elements present. The word "on" or "above" means positioned on or below the object portion, and does not necessarily mean positioned on the upper side of the object portion based on a gravitational direction.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The terms "below" or "beneath" can, therefore, encompass both an orientation of above and below.

The phrase "in a plan view" means viewing an object portion from the top, and the phrase "in a cross-sectional view" means viewing a cross-section of which the object portion is vertically cut from the side.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims An optical inspection device according to an embodiment will now be described with reference to FIG. 1 to FIG. 6.

Figure 2:
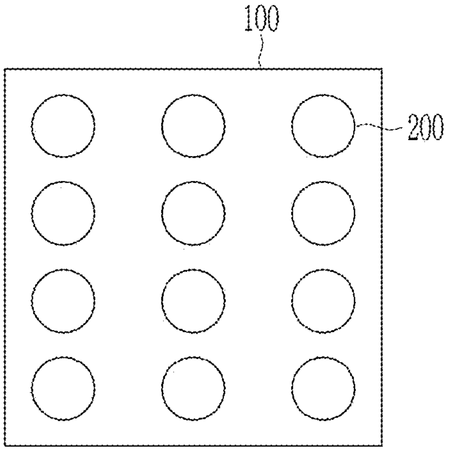
FIG. 2 shows a top plan view of twelve high-resolution cameras of FIG. 1.
Figure 3:
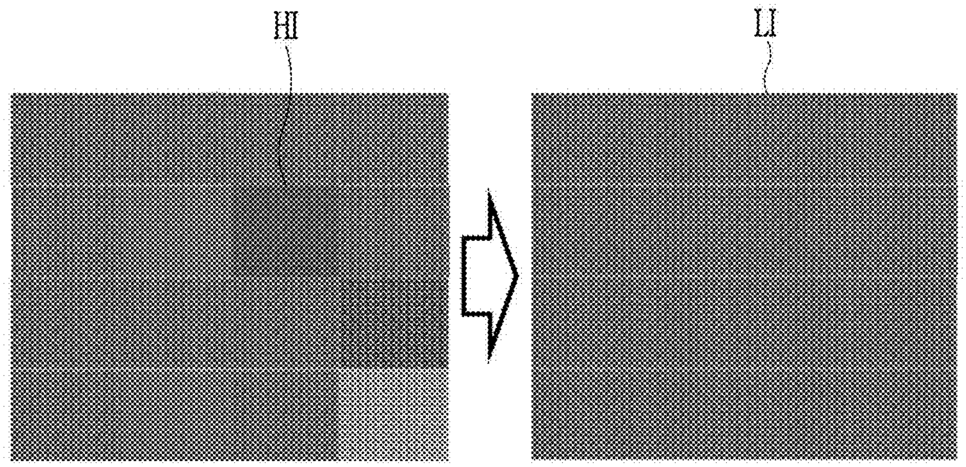
FIG. 3 shows that a high-resolution image photographed by using a high-resolution camera of FIG. 1 is converted into a low-resolution image.

FIG. 1 shows an optical inspection device according to an embodiment, and FIG. 2 shows a top plan view of twelve high-resolution cameras of FIG. 1, and FIG. 3 shows that a high-resolution image photographed by using a high-resolution camera of FIG. 1 is converted into a low-resolution image.

As shown in FIG. 1 to FIG. 3, an embodiment of the optical inspection device includes an optical inspection main body 100, a plurality of high-resolution cameras 200, and an image converter 300.

The optical inspection main body 100 may mount a target substrate 10 for inspecting whether there are foreign substances.

The high-resolution cameras 200 may be spaced from the target substrate 10, may be installed in the optical inspection main body 100, and may photograph a plurality of high-resolution images HI. In an embodiment, for example, each of the high-resolution cameras 200 may have a resolution of about 0.6 micrometer (μm) to about 3 μm per pixel. in an embodiment, as shown in FIG. 2, twelve high-resolution cameras may be disposed in the 4×3 matrix form, but is not limited thereto, and a various number of high-resolution cameras may be disposed.

The image converter 300 may convert the high-resolution images HI into a low-resolution image LI. The high-resolution images HI may be photographed by the high-resolution cameras 200, respectively. A resolution of each of the high-resolution images HI may be higher than a resolution of the low-resolution image LI. In an embodiment, for example, the resolution of each of the high-resolution images HI may be about 1.5 μm per pixel, and the resolution of the generated low-resolution image LI may be about 9 μm per pixel.

In an embodiment, as shown in FIG. 3, high-resolution images HI may be converted into a low-resolution image LI by using the image converter 300.

The image converter 300 may include a gray uniformizer 310 and an image bonding portion 320.

The gray uniformizer 310 may adjust the grays (i.e., grayscales) of the high-resolution images HI so that gray deviations among the high-resolution images HI may be equal to or less than a deviation reference value RV. Here, the deviation reference value RV may be 0.5, but it is not limited thereto, and it is modifiable by desired gray uniformity.

The grays of the high-resolution images obtained by photographing regions of the target substrate 10 may be different from each other because of intensity of illumination and flatness of the target substrate. The bigger the target substrate 10 is, the more this phenomenon increases.

Therefore, the gray uniformizer 310 may adjust the grays of the high-resolution images in a way such that the grays among the high-resolution images HI may become uniform.

This will now be described in detail with reference to FIG. 4 to FIG. 6.

Figure 4:
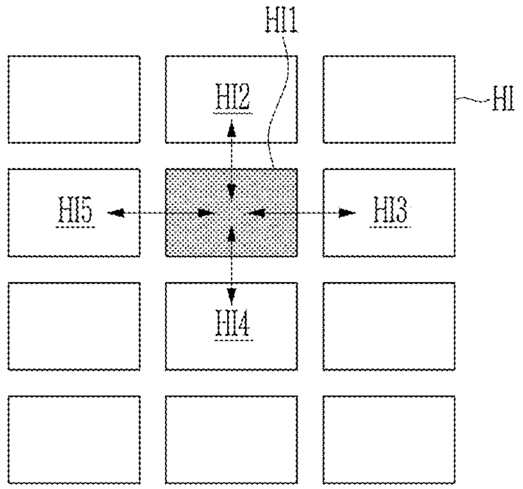
FIG. 4 to FIG. 6 show an embodiment of a method for adjusting grays of twelve high-resolution images photographed by a high-resolution camera of FIG. 2.
Figure 5:
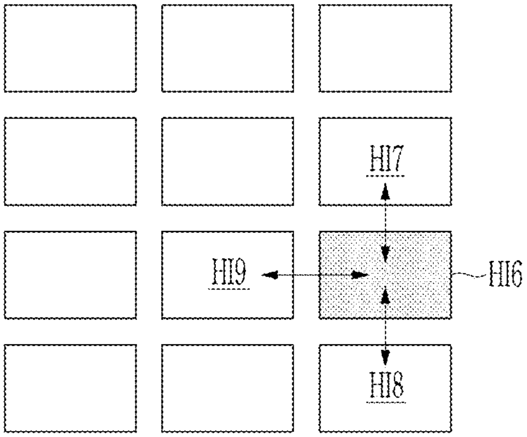
Figure 6:
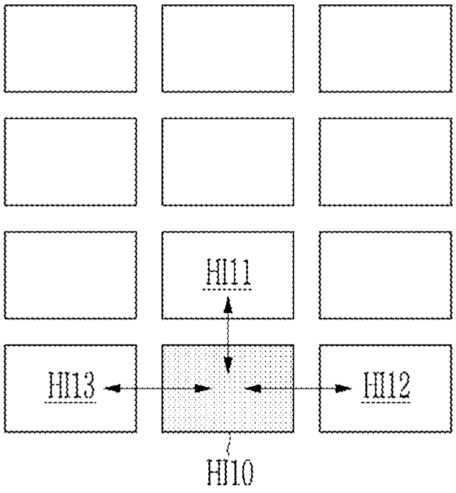

FIG. 4 to FIG. 6 show an embodiment of a method for adjusting grays of twelve high-resolution images photographed by a high-resolution camera of FIG. 2.

In an embodiment, the gray uniformizer 310 compares adjacent high-resolution images and detects high-resolution images with a maximum gray deviation, and uniformizes the grays among the detected high-resolution images. In an embodiment, as shown in FIG. 4, it may be found (or determined) that the gray of the first high-resolution image HI1 and the grays of the second to fifth high-resolution images HI2, HI3, HI4, and HI5 surrounding the first high-resolution image HI1 have the maximum difference. That is, it may be found that a gray deviation between the first high-resolution image HI1 and the second to fifth high-resolution images HI2, HI3, HI4, and HI5 has the maximum value. It may be then found whether the gray deviation is equal to or less than the deviation reference value. When the gray deviation is greater than the deviation reference value, the gray of the first high-resolution image HI1 may be adjusted to be equal to the grays of the second to fifth high-resolution images HI2, HI3, HI4, and HI5.

In an embodiment, as shown in FIG. 5, the adjacent high-resolution images are compared to detect the high-resolution images with the maximum gray deviation. That is, it may be found that the gray deviation between the sixth high-resolution image HI6 and the seventh to ninth high-resolution images HI7, HI8, and HI9 has the maximum value. It may be found whether the gray deviation is equal to or less than the deviation reference value. When the gray deviation is greater than the deviation reference value, the gray of the sixth high-resolution image HI6 may be adjusted to be equal to the grays of the seventh to ninth high-resolution images HI7, HI8, and HI9.

In an embodiment, as shown in FIG. 6, the adjacent high-resolution images are compared to detect the high-resolution images with the maximum gray deviation. That is, it may be found that the gray deviation between the tenth high-resolution image HI10 and the eleventh to thirteenth high-resolution images HI11, HI12, and HI13 has the maximum value. It may be found whether the gray deviation is equal to or less than the deviation reference value. When the gray deviation is equal to or less than the deviation reference value, the image in this state becomes the final compensated image.

In an embodiment, as described above, compensated images may be generated by repeating adjustment of the grays among the adjacent high-resolution images so that the gray deviation may be equal to or less than the deviation reference value. Here, the compensated images mean images having a uniform gray that is equal to or less than the deviation reference value.

The image bonding portion 320 may generate a low-resolution image LI by bonding (e.g., combining or splicing) the compensated images.

Figure 7:
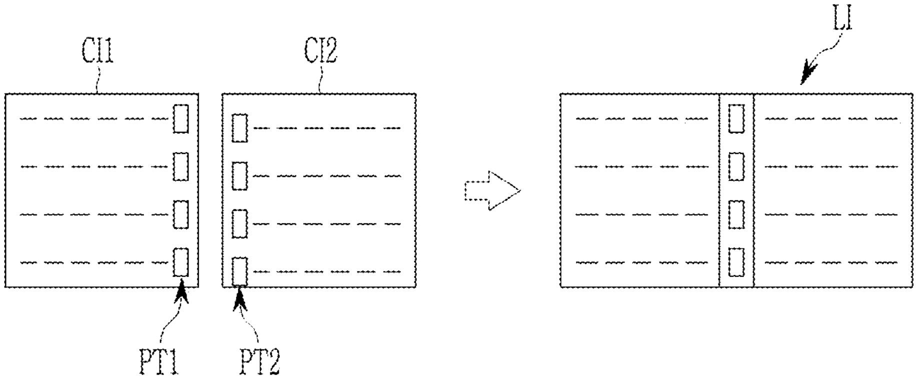
FIG. 7 shows an operation of an image bonding portion of an optical inspection device according to an embodiment, showing a process for generating a low-resolution image by bonding compensated images.

FIG. 7 shows an operation of an image bonding portion of an optical inspection device according to an embodiment, showing a process for generating a low-resolution image by bonding compensated images.

In an embodiment, as shown in FIG. 7, patterns PT1 and PT2 that are similar to each other are arranged and bonded to each other between the adjacent compensated images CI1 and CI2. Therefore, one low-resolution image LI with a uniform gray may be generated.

A low-resolution inspection may be performed by using the low-resolution image LI.

In an embodiment, as described above, the high-resolution inspection may be performed by using a high-resolution camera, and the low-resolution inspection may be performed by using a high-resolution camera without using an additional low-resolution camera, such that the manufacturing process cost may be reduced.

An optical inspection method using an optical inspection device according to an embodiment will now be described in detail with reference to drawings.

Figure 8:
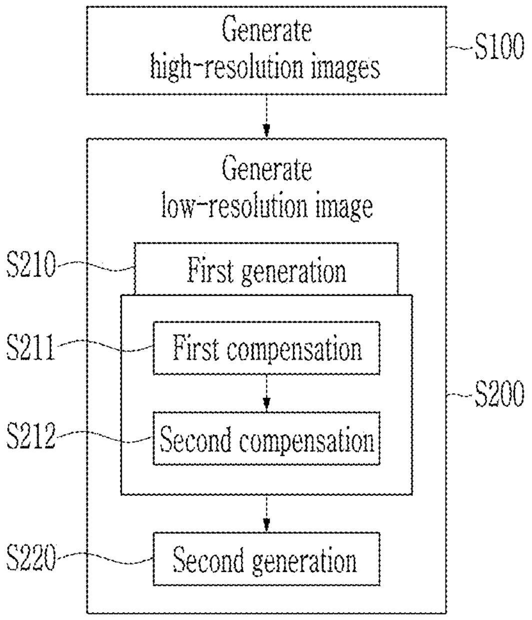
FIG. 8 shows an optical inspection method according to an embodiment.

FIG. 8 shows an optical inspection method according to an embodiment.

In an embodiment, as shown in FIG. 1 and FIG. 8, the target substrate 10 is photographed by using high-resolution cameras 200, thereby generating high-resolution images HI (S100).

The image converter 300 converts the high-resolution images HI into a low-resolution image LI (S200).

An embodiment of a method for generating the low-resolution image LI will now be described in detail.

The grays of the high-resolution images HI are adjusted by using the gray uniformizer 310 so that the gray deviation of the high-resolution images HI may be equal to or less than the deviation reference value (a first generation stage S210). Here, the deviation reference value may be 0.5.

In an embodiment, as shown in FIG. 4 to FIG. 6 and FIG. 8, the adjacent high-resolution images HI are compared to make the grays among the high-resolution images HI with the maximum gray deviation equal to each other (a first compensation stage S211) to adjust the grays of the high-resolution images HI. Compensated images are generated by repeating the first compensation stage (or operation) so that the gray deviation may be equal to or less than the deviation reference value (a second compensation stage S212).

In an embodiment, as shown in FIG. 7 and FIG. 8, a low-resolution image LI is generated by bonding or combining compensated images CI1 and CI2 having a uniform gray that is equal to or less than the deviation reference value (a second generation stage S220). Here, the patterns PT1 and PT2 that are similar to each other may be arranged between the adjacent compensated images CI1 and CI2 and may be bonded.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. An optical inspection device comprising:

an optical inspection main body on which a target substrate is mounted;

a plurality of high-resolution cameras spaced from the target substrate and disposed in the optical inspection main body, wherein the high-resolution cameras photograph a plurality of high-resolution images for micro inspection; and an image converter which converts the high-resolution images into a low-resolution image for macro inspection, wherein a resolution of each of the high-resolution images is higher than a resolution of the low-resolution image, and wherein the image converter includes:

a gray uniformizer which adjusts grays of the high-resolution images by performing a compensation operation, wherein the compensation operation comprises: comparing adjacent high-resolution images to detect high-resolution images with a maximum gray deviation; and uniformizing grays among the detected high-resolution images when a gray deviation among the high-resolution images is greater than a deviation reference value, wherein the compensation operation is repeated to generate a plurality of compensated images until each of the gray deviations among all the high-resolution images is equal to or less than the deviation reference value; and an image bonding portion which generates the low-resolution image by arranging patterns which are similar to each other between the compensated images and combining the patterns to each other to allow the gray deviation to be equal to or less than the deviation reference value.

2. The optical inspection device of claim 1, wherein the deviation reference value is 0.5.

3. The optical inspection device of claim 1, wherein each of the high-resolution camera has a resolution of 0.6 μm to 3 μm per pixel.

4. The optical inspection device of claim 3, wherein the high-resolution cameras include twelve high-resolution cameras disposed in a 4×3 matrix form.

5. An optical inspection method comprising:

generating a plurality of high-resolution images by photographing a target substrate by using a plurality of high-resolution cameras;

performing a micro inspection using the plurality of high-resolution images;

converting the high-resolution images into a low-resolution image by using an image converter; and performing a macro inspection using the low-resolution image, wherein a resolution of each of the high-resolution images is higher than a resolution of the low-resolution image, and wherein the converting the high-resolution images into the low-resolution image includes adjusting grays of the high-resolution images, by using a gray uniformizer, by performing a compensation operation, wherein the compensation operation comprises: comparing adjacent high-resolution images to detect high-resolution images with a maximum gray deviation; and uniformizing grays among the detected high-resolution images when a gray deviation among the high-resolution images is greater than a deviation reference value;

repeating the compensation operation to generate a plurality of compensated images until each of the gray deviations among all the high-resolution images is equal to or less than the deviation reference value; and combining the compensated images to generate the low-resolution image by arranging patterns which are similar to each other between the compensated images and combining the patterns to each other.

6. The optical inspection method of claim 5, wherein the deviation reference value is 0.5.

* * * * *